3,795,547

METHOD OF IMPROVING ELECTRICAL CHARACTERISTICS OF HIGH PURITY GERMANIUM OR SILICON

Robert N. Hall, Schenectady, N.Y., assignor to General Electric Company

Filed Dec. 13, 1972, Ser. No. 314,541
Int. Cl. B01j 17/38, 17/40; H01l 7/34
U.S. Cl. 148—1.6 12 Claims

ABSTRACT OF THE DISCLOSURE

The electrical conduction properties of high purity semiconductor material particularly with regard to freedom from lattice defects are improved by heating or annealing a large ingot of high purity semiconductor in a molten bath of selected high purity metal or metal alloy at elevated temperatures for times of the order of 400 to 1000 hours.

Figure 1:
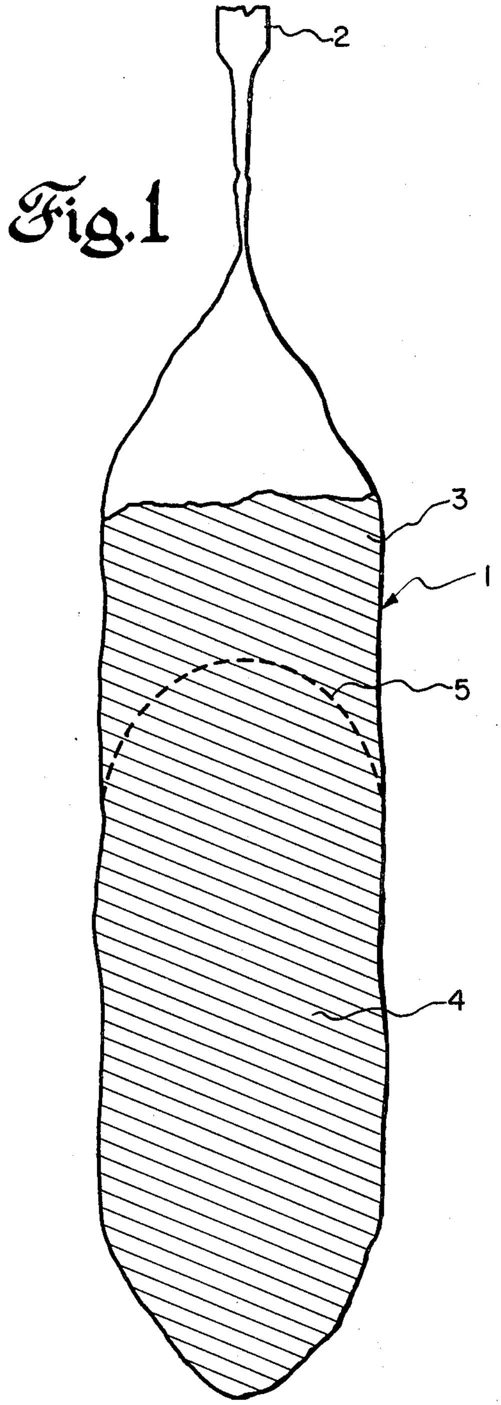

The present invention relates to the improvement of electrical characteristics of semiconductor crystals through the elimination of lattice defects and impurity concentration gradients therein. More particularly, the invention pertains to such electrical improvements in very large crystalline ingots of high purity semiconductor materials. While the invention has a general applicability to high purity semiconductors such as germanium, silicon and Group III–V compounds such as gallium antimonide, for purposes of ease of explanation thereof, the invention will be described herein specifically with respect to its practice with germanium.

Germanium of very high purity has a multiplicity of uses and is exceedingly difficult to prepare. Presently, the best available germanium is prepared by seed crystal withdrawal of a crystalline ingot from a melt of molten germanium semiconductor conducted under very carefully controlled conditions such as precisely controlled temperature, inert gas atmosphere, and uniform degree of withdrawal together with appropriate speed of rotation. Germanium prepared by such method, generally referred to as the Czochralski Seed Crystal Withdrawal Method, prepared with great care to eliminate chemical impurities, is of the order of purity as represented by the presence therein of no greater than approximately the order of $10^{10}$ electrically active impurities per cubic centimeter thereof.

The attainment of such high purity germanium has been made possible by careful preparation of the base material as, for example, by repeated zone levelings or by multiple seed crystal withdrawal, utilizing noncontaminating crucibles and generally with careful selection of atmosphere. Heretofore the greatest effort has been expended on reducing to the smallest possible quantity the concentration of electrically active impurities as, for example, the conventional Group III acceptors such as boron, gallium, indium, and aluminum, and the conventional donor impurities as, for example, arsenic, antimony and phosphorus of Group V of the Periodic Table of the Elements.

Even with the attainment of the aforementioned purity, the electrical characteristics of germanium obtained by such methods are still greatly hampered by the presence therein of lattice defects which may serve as deep level trapping sites for electrons and holes and which are as detrimental as the presence of electrically significant chemical impurities therein.

Previous investigations of lattice defects have involved the creation of high concentrations thereof by means of exposure of the germanium to a high temperature, followed by their subsequent removal during heat treatment at lower temperatures. Despite the effort provided to anneal out lattice defects, heretofore the quality of the germanium ingots in particular and semiconductor ingots in general, has never substantially improved over the quality of the germanium or semiconductor in the initially grown crystalline ingot. Some references to work of this nature are articles entitled "Thermally Induced Acceptors in Germanium," by Logan, published in Physical Review, vol. 101, page 1455 (1956); "Vacancies and Interstitials in Heated Germanium" by Mayburg, Physical Review, vol. 95, page 38 (1954); "Investigation of Quenched-In Defects in Ge and Si by Means of $^{64}Cu$," by Fuller and Wolfstein, Journal of the Physics and Chemistry of Solids, vol. 26, page 1463 (1965); and "Experimental Determination of Diffusion and Formation Energies of Thermal Vacancies in Germanium," by Hiraki, Journal of the Physical Society of Japan, vol. 21, page 36 (1966).

Accordingly, it is an object of the present invention to provide means for removing residual lattice defects from crystals of semiconductor materials of high purity Still another object of the present invention is to eliminate from high purity germanium a source of deep trapping levels which is detrimental to the electrical characteristics thereof.

Yet another object of the present invention is to improve the homogeneity and lifetime of high purity semiconductor material.

A further object of the present invention is to provide a means of removing fast-diffusing chemical impurities that may be present in the germanium as initially prepared.

Briefly stated, in accord with one embodiment of the present invention, a high purity germanium ingot to be processed to improve the electrical characteristics and remove lattice defects therefrom is immersed in a molten bath of an active getter material as, for example, an alloy of bismuth and lead and preferably the eutectic alloy thereof, and maintained at a temperature of approximately 380° to 420° C. for a period of time ranging from approximately 400 to 1000 hours. For removing such defects from silicon the process is carried out at a temperature range of approximately 600° C. for approximately 1000–12000 hours.

Figure 2:
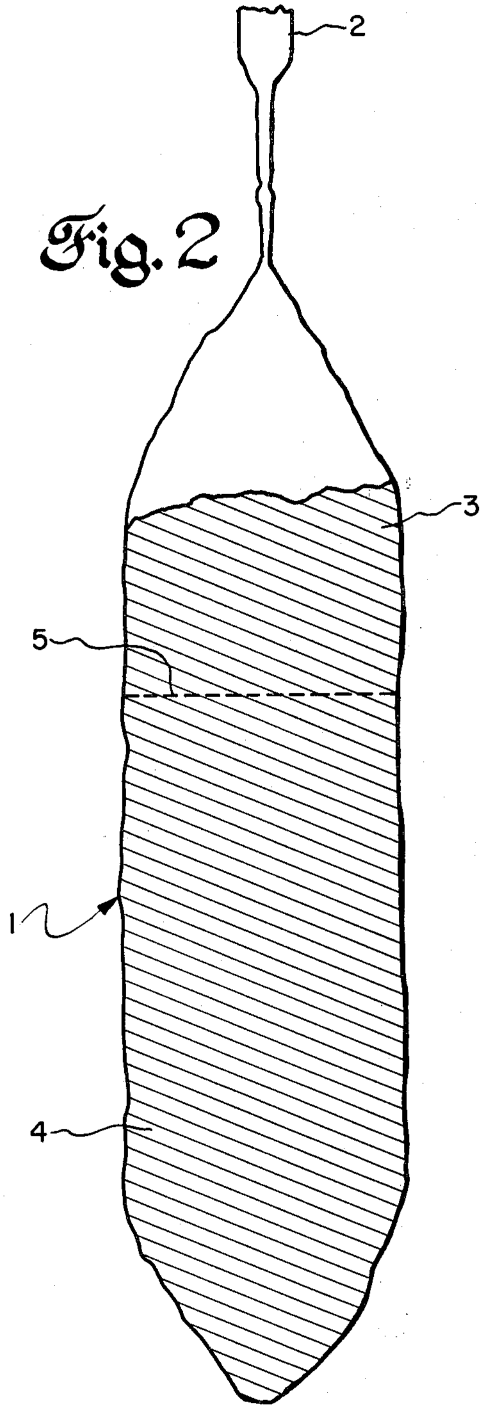

The novel features characteristic of the invention are set forth in the appended claims. The invention itself, together with further objects and advantages thereof may best be understood by references to the following detailed description taken in connection with the appended drawing in which:

FIG. 1 is a vertical cross-sectional view of a high purity germanium crystalline ingot indicating the concentration gradient therein prior to the practice of the present invention, and FIG. 2 is a similar illustration of the same ingot after practice of the method in accord with the present invention.

As is well known to the art, lattice defects are due to missing or improperly located atoms of the host crystal lattice and may be as significant as chemical impurity atoms therein insofar as the electrical charcteristics of the semiconductor host are concerned under certain circumstances. This is particularly true for highly purified germanium as, for example, germanium having a purity as represented by a presence of uncompensated electrically active (donor or acceptor) impurities of the order of $10^{10}$ per cubic centimeter thereof. Such lattice defects act as electron and hole traps and tend to render the material in which they are present lightly P-type. Thus when an ingot is grown having a residual concentration of uncompensated donor impurities, the accumulation of lattice defects is such as to render a portion of the ingot (generally the first grown portion) P-type and the remainder of the ingot may be N-type due to the concentration of the residual donor impurities therein due to segregation thereof. Thus, for example, a typical as-grown ingot having a relatively large diameter as, for example, 4 centimeters, and a length of approximately 20 centimeters, may have a configuration as is illustrated in FIG. 1 of the drawings, wherein ingot 1 is grown upon a seed crystal 2 and contains a first grown portion 3 having a sufficient number of lattice defects as to render the material lightly P-type, whereas the remainder of the ingot 4 has a lightly N-type conduction characteristic and a P–N junction 5 separates the two. P–N junction 5 has meniscus-like configuration that is concave from the bottom due to the greater concentration of lattice defects near the surface of the crystal combined with the normal segregation of donor impurities which causes their concentration to increase along the lengths of the crystal. The presence of the P–N junction is not disadvantageous, but its shape, due to lattice defects is, because any transverse section of the crystal is not homogeneous.

Such an ingot is of limited usefulness in the preparation of devices utilizing such high purity germanium as, for example, high energy particle detectors, for the reason that the attainment of a large area detector having uniform detection properties over its area requires that the distribution of impurities in the germanium must also be uniform. Furthermore, in the preparation af a plurality of small detectors from a wafer cut from a crystal having an impurity distribution such as that illustrated in FIG. 1, the yield of detectors having optimum characteristics would be very small due to the large variation in defect concentration across the diameter of the crystal. In a typical crystal of germanium grown in accord with the most highly refined prior art processes available, the lattice defect concentration in region 3 may vary from nearly zero at the center to as high as $5\times10^{10}$ per cubic centimeter thereof near the outer portions thereof.

A further difficulty associated with a crystal having a radial distribution of lattice defects is that they often have a highly conducting surface layer or "skin" which shields the interior of the crystal and makes it impossible to measure the electric characteristics thereof without cutting up the crystal and thereby destroying its usefulness for making detectors.

As is mentioned hereinbefore, lattice defects may be changed and removed by annealing, at least in theory. One problem is that it is very difficult to prevent contamination by fast diffusing impurities. Another problem with annealing is that while the equilibrium concentration of lattice defects decreases very rapidly with decreasing temperature, the rate at which such equilibrium is approached becomes extremely slow at low temperatures. Furthermore, the defect interactions during annealing are quite complex and not fully understood so that the attainment of an annealing schedule that gives a significant reduction in the defect concentration is an exceedingly difficult task. Thus, for example, I have found that high purity germanium ingots having a dimension of approximately two to five centimeters in diameter often show a large initial increase in defect concentration during annealing, which is then followed by a gradual decrease, leading eventually to their nearly complete removal. The problem with this characteristic is that the time necessary for such complete removal is prohibitively long, often running into a matter of many months at 357° C., which is done by annealing in a bath of mercury maintained at its boiling temperature.

On the other hand, I have found that at a temperature of 450° C., or higher, the times required for the lattice defect concentration to reach equilibrium are relatively short, but the equilibrium defect concentration is too high to be satisfactory for most usages of the high purity germanium with which such annealing is required to be practiced.

I have found, however, that annealing at very carefully chosen temperatures and under carefully controlled gettering ambient conditions can achieve the desired removal of lattice defects from high purity semiconductors. As a general temperature criterion, I have found that the annealing should be conducted at an approximate temperature at which plastic deformation begins. That is to say, the temperature at which, for a strain of 6 kg./mm.$^2$ the dislocation velocity of the semiconductor is approximately $2\times10^{-5}$ cm./sec. See for example "Velocities and Densities of Dislocations in Germanium and Other Semiconductor Crystals," by Chandhauri, Patet and Rubin, J. Appl. Phys., vol. 33, page 2736 (1962). Such approximate thresholds are, for example, germanium 400° C.; silicon 620° C.; gallium antimonide 320° C.; indium antimonide 120° C.

More specifically, I have found that a suitable and unique process for the removal of lattice defects in high purity germanium ingots, for example, of substantial size, in excess of 2 centimeters in diameter, may be achieved by immersing the crystal or the ingot in a suitable liquid metal which acts as a getter for fast-diffusing impurities, such as copper, iron, and lithium, thus serving both to avoid contamination of the ingot by such fast diffusing mobile impurities which might otherwise happen if the anneal is conducted in air or in a so-called inert atmosphere, as well as to remove any such residual mobile impurities which may have preexisted within the germanium ingot. Such gettering material, having a strong affinity for these mobile impurities, prevents them from entering and contaminating the germanium ingot, thus allowing for, at the very least, the maintenance of the high purity germanium, and in some instances improving the same.

Materials suitable for the getter metal in which germanium and other semiconductor ingots are immersed during annealing in accord with the present invention include metals or metal alloys which are molten within the operative temperature range of the invention which, considering the foregoing limitations, for germanium is approximately 380° to 420° C. Such metals should also be active getters for mobile inpurities such as copper and iron, and preferably they should have a low solubility for the semiconductor in this temperature range. I have determined that lead and bismuth, and alloys therebetween, are well suited for this purpose. These materials are also particularly advantageous since they do not have a boiling point or substantial evaporation point within the operative temperature ranges. Preferably, the eutectic alloy of bismuth and lead containing approximately 44.5 weight percent lead is ideally suitable for practicing the present invention with germanium, although other alloy compositions and either bismuth or lead in the elemental form are suitable. The material used in accord with the present invention must be of high purity in order to prevent contamination of the semiconductor and should be 99.999% purity, or better. Such materials are equally suitable for practicing the invention with silicon ingots, although indium is preferred.

In order that the use of the getter materials be of maximum effectiveness, their high purity should be maintained by using a high purity non-reactive crucible for containing the getter and the semiconductor crystal and by using a flow of an inert gas such as nitrogen to prevent contamination by amient. Suitable crucible materials include quartz, graphite and silicon nitride, for example.

Utilizing the temperatures set forth herein and the materials described above, I have found that an annealing time of approximately 400 to 1000 hours is suitable, although the use of longer times is always beneficial, and results in an ingot having a hole concentration that is essentially perfectly flat which is indicative of the absence of defects throughout the extrinsic temperature range of 20 to 150° K. after treatment, as compared with untreated crystals which show not only a very substantial change in the concentration of lattice defects over the length of the crystal, but which also show a substantial radial gradient thereof through the crystal at any given point.

I have found that, ideally, a schedule which is suitable for the production of high purity lattice defect-free samples of large high purity germanium crystalline ingots and which is a reasonable schedule for production encompasses the use of a molten getter of the eutectic alloy of bismuth and lead maintained at a temperature of approximately 400° C. and heated for a time of approximately 400 to 600 hours.

One example of the practice of the invention in accord with the teachings herein is as follows. A high purity germanium crystalline ingot grown by the seed crystal withdrawal method and having a diameter of approximately 4 centimeters and a length of approximately 20 centimeters and weighing 1600 grams, was etched with "white etch" (3 parts concentrated nitric acid; 1 part concentrated hydrofluoric acid by volume) to remove surface impurities, placed in a clean quartz crucible and with 75 cubic centimeters of the eutectic alloy having 99.9999% purity bismuth and lead and placed in a furnace at a temperature of 407° C. After the alloy had melted, the germanium was held submerged within the liquid metal with a quartz pushrod and oxidation of the molten alloy was minimized by flowing nitrogen at a rate of 100 liters per hour through the furnace. After approximately 400 hours at 407° C., the furnace was cooled to approximately 150° C., the crucible was removed therefrom, the bismuth-lead poured off and the germanium wiped with cotton cloth to remove the molten alloy therefrom. After cooling to room temperature, it was first soaked in nitric acid for 1 hour to remove the residual alloy and then etched with "white etch" and washed with distilled water.

Measurements of Hall coefficient vs. temperature made on a sample cut from the aforementioned crystal show that the hole concentration was perfectly flat throughout the extrinsic range of 20 to 150° K. which signifies that no "freeze-out" of conduction carriers into deep-level impurity states occurred in this temperature range. Electrical tests also showed that there was no radial gradient in electrical characteristics throughout the crystal, although a flat P-N junction 5, as shown in FIG. 2 was present. Such material, after processing, is useful for X-ray detectors of high resolution, infra-red detectors, and high precision X-ray spectrometers.

The benefits achieved through the use of the annealing treatment herein described are further illustrated by the change in behavior of crystals which previously exhibited the P-type "skin" mentioned above. Whereas, before annealing, the electrical properties of these crystals could not be determined by any known methods of evaluation, after annealing, they exhibit clean, readily-measurable properties, completely free of the effects that had been caused by the lattice defects.

Although the preferred materials set forth herein are bismuth, lead, and alloys therebetween, and preferably the eutectic alloy thereof, the invention may also be practiced with other metals including tin or indium as the getter material. These materials do have the disadvantage that they tend to dissolve away a portion of germanium ingots which is therefore lost and must then be recovered from the molten tin or indium. If, however, the economics of the situation indicate that tin or indium should be used with germanium rather than lead, bismuth or an alloy thereof and the nominal loss of germanium to the getter metal can be tolerated, then such use may be indicated in particular applications.

While the invention has been described with respect to the purification and removal of lattice defects from seed crystal withdrawal grown crystals of germanium, it is not so restricted and may be practiced upon ingots of other semiconductors especially silicon and upon ingots formed by other methods of fractional crystallization which result in improvement of the impurity of the semiconductor material. Thus, for example, semiconductor material prepared by multiple pass zone leveling, float zoning, and other well known fractional crystallization methods, or by epitaxial deposition and having a purity sufficient that removal of lattice defects is advantageous to achieve the optimum electrical characteristics of the germanium therefrom, may be treated in accord with the invention to great advantage.

While the invention has been set forth herein with respect to certain embodiments and specific examples thereof, it is readily apparent to those skilled in the art that many modifications and changes may be made in light of the disclosure herein. Accordingly, it is intended by the appended claims to cover all such modifications and changes as fall within the true spirit and scope of the foregoing disclosure.

What I claim as new and desire to secure by Letters Patent of the United States is:

1. A method of improving the electrical characteristics of a body of high purity semiconductor which method comprises:

(a) Immersing said body in a quantity of a melt of at least one active metal having gettering properties for removing mobile impurities from said semiconductor;

(b) Maintaining said body at a temperature at least as high as the threshold for plastic deformation of the semiconductor for at least 400 hours.

2. The method of claim 1 wherein said semiconductor is selected from the group consisting of germanium and silicon.

3. The method of claim 1 wherein said melt contains an active metal selected from the group consisting of lead, bismuth, tin and indium.

4. The method of claim 3 wherein said lead and bismuth are in the form of the eutectic alloy thereof containing approximately 44.5 weight percent lead.

5. The method of claim 2 wherein said melt comprises lead and bismuth.

6. The method of claim 5 wherein said alloy has a purity of at least 99.999%.

7. The method of claim 5 wherein said melt is maintained in an atmosphere of a flowing inert gas during heating.

8. The method of claim 7 wherein said gas is nitrogen.

9. The method of claim 1 wherein said semiconductor is germanium and said melt is maintained at a temperature of approximately 380° C. to 420° C.

10. The method of claim 9 wherein said melt is maintained at a temperature of approximately 400° C. for approximately 400 to 800 hours.

11. The method of claim 1 wherein said semiconductor is silicon and said melt is maintained at a temperature of approximately 600° C.

12. The method of claim 11 wherein said melt comprises high purity indium.

References Cited

UNITED STATES PATENTS

| | | | |
|---|---|---|---|
| 2,835,613 | 5/1958 | Haayman | 148—186 |
| 2,859,140 | 11/1958 | Clark | 148—1.5 |
| 3,390,020 | 6/1968 | Mandelkorn | 148—1.5 |
| 3,496,118 | 2/1970 | Wilardson et al. | 148—1.6 X |
| 3,650,823 | 3/1972 | Mead et al. | 148—1.5 X |

GEORGE T. OZAKI, Primary Examiner

U.S. Cl. X.R.

148—1.5, 20.6, 186; 423—348; 75—134 G